(12) United States Patent
Rousseau et al.

(10) Patent No.: US 10,151,876 B2
(45) Date of Patent: Dec. 11, 2018

(54) LIGHT COLLECTING DEVICE

(71) Applicant: ESSILOR INTERNATIONAL, Charenton-le-Pont (FR)

(72) Inventors: Denis Rousseau, Charenton-le-Pont (FR); Samuel Archambeau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/741,855

(22) PCT Filed: Jul. 5, 2016

(86) PCT No.: PCT/EP2016/065886
§ 371 (c)(1),
(2) Date: Jan. 4, 2018

(87) PCT Pub. No.: WO2017/005756
PCT Pub. Date: Jan. 12, 2017

(65) Prior Publication Data
US 2018/0210145 A1    Jul. 26, 2018

(30) Foreign Application Priority Data
Jul. 7, 2015    (EP) ...................................... 15306116

(51) Int. Cl.
*G02B 6/10*    (2006.01)
*G02B 23/18*    (2006.01)
(Continued)

(52) U.S. Cl.
CPC ................. *G02B 6/10* (2013.01); *G02B 5/20* (2013.01); *G02B 23/18* (2013.01); *G02B 27/2235* (2013.01); *G03B 35/10* (2013.01)

(58) Field of Classification Search
CPC ...... G02B 6/10; G02B 23/18; G02B 27/2235; G02B 5/20; G03B 35/10
See application file for complete search history.

(56) References Cited

U.S. PATENT DOCUMENTS 5,349,403 A       9/1994  Lo
9,357,116 B1 *    5/2016  Kozko ............... G02B 27/0025
(Continued)

FOREIGN PATENT DOCUMENTS

CN    103207450 A    7/2013
DE    40 12 964 A1    10/1990
(Continued)

OTHER PUBLICATIONS

International Search Report dated Dec. 7, 2016, in PCT/EP2016/065886 filed Jul. 5, 2016.

*Primary Examiner* — Ryan Lepisto
(74) *Attorney, Agent, or Firm* — Oblon, McClelland, Maier & Neustadt, L.L.P.

(57) ABSTRACT

A light collecting device is adapted to collect and guide light to a light sensor. The device includes a monocular collecting module including at least one light collector configured to collect light from the environment of the device, a binocular collecting module including a first and a second distant light collector configured to collect light from the environment of the device, and an optical waveguide configured to guide the light collected from the monocular and binocular collecting modules to a light sensor.

15 Claims, 4 Drawing Sheets

(51) Int. Cl.
*G02B 27/22* (2018.01)
*G02B 5/20* (2006.01)
*G03B 35/10* (2006.01)

(56) References Cited

U.S. PATENT DOCUMENTS

| | | | |
|---|---|---|---|
| 9,497,367 B1* | 11/2016 | Kozko | H04N 5/2254 |
| 9,667,845 B2* | 5/2017 | Mirlay | G02B 27/1066 |
| 9,854,164 B1* | 12/2017 | Kozko | H04N 5/23238 |
| 2005/0078364 A1* | 4/2005 | Tseng | G02B 23/18 |
| | | | 359/410 |
| 2009/0116127 A1 | 5/2009 | Liang | |
| 2010/0045773 A1* | 2/2010 | Ritchey | G02B 13/06 |
| | | | 348/36 |
| 2011/0315863 A1* | 12/2011 | Yu | H01L 31/02325 |
| | | | 250/229 |
| 2012/0098971 A1* | 4/2012 | Hansen | H04N 5/2258 |
| | | | 348/164 |
| 2012/0236123 A1* | 9/2012 | Chen | H04N 13/239 |
| | | | 348/47 |
| 2015/0277014 A1 | 10/2015 | Schrader | |

FOREIGN PATENT DOCUMENTS

| | | |
|---|---|---|
| JP | 2008-180808 A | 8/2008 |
| WO | 2014/053883 A1 | 4/2014 |

\* cited by examiner

LIGHT COLLECTING DEVICE

FIELD OF THE INVENTION

The invention relates to a light collecting device adapted to collect and guide light to a light sensor.

The invention further concerns a light acquisition device comprising a light collecting device according to the invention.

The invention also relates to a method for calibrating a light acquisition device according to the invention.

The invention further concerns a method for personalizing a light collecting device according to the invention.

BACKGROUND OF THE INVENTION

For different applications, in particular for embedded camera mounted on a head mounted device, there is a need to acquire data for providing two-dimensional and/or three-dimensional images of an environment.

However, current devices allowing acquiring data for providing three-dimensional images of an environment are complex and expensive. Indeed, often such devices comprise two cameras that need to be synchronized. Moreover, such devices are voluminous and require complex calibration methods. Furthermore, other devices adapted for acquiring data for providing three-dimensional images, such as laser projection and image capture or time of flight cameras, are also bulky and expensive.

Thus, there is a need to provide a device adapted to acquire data for providing two-dimensional and/or three-dimensional images of an environment, which is simple, small and low cost and may be configurable for providing either two-dimensional either three-dimensional images either both two-dimensional and three-dimensional images of an environment.

SUMMARY OF THE INVENTION

To this end, the invention proposes a light collecting device adapted to collect and guide light to a light sensor, the device comprising:
- a monocular collecting module comprising at least one light collector configured to collect light from the environment of the device,
- a binocular collecting module comprising a first and a second distant light collector configured to collect light from the environment of the device,
- an optical waveguide configured to guide the light collected from the monocular and binocular collecting modules to a light sensor so that:
  - the light collected by the monocular collecting module is guided to a monocular zone of the light sensor,
  - the light collected by the first light collector of the binocular collecting module is sent to a first zone of the light sensor, and
  - the light collected by the second light collector of the binocular collecting module is sent to a second zone of the light sensor,
wherein the optical waveguide is configured so that said first zone and said second zone of the light sensor have no overlap.

Advantageously, the light collecting device allows a user to acquire two-dimensional and/or three-dimensional images with only one light sensor, thus avoiding the complex process of sensors synchronization. Moreover, such device is simple, easy to use and low cost.

According to embodiments, the light collecting device according to the invention may further comprise one or any possible combination of the following features:
- the optical waveguide is configured so that the monocular zone of the light sensor and the first and second zones of the light sensor have no overlap, and/or
- in said monocular state, the light collected by the first and second light collector of the binocular collecting module is not sent to the first and second zone of the light sensor, and in said binocular state, the light collected by the monocular light collector is not sent to the monocular zone of the light sensor, and/or
- the optical waveguide comprises an optical switch configured between a monocular state wherein the light collected by the monocular collecting module is guided to the monocular zone of the light sensor and a binocular state wherein the light collected by the first light collector of the binocular collecting module is sent to the first zone of the light sensor, and the light collected by the second light collector of the binocular collecting module is sent to the second zone of the light sensor, and/or
- in the monocular state the optical switch is configured to send directly the light received by the monocular collecting module to the light sensor and in the binocular state the optical switch is configured to reflect the light received by the first light collector of the binocular collecting module to the first zone of the light sensor and the light received by the second light collector of the binocular collecting module to the second zone of the light sensor, and/or
- the optical switch is mechanically controllable between the different states, and/or
- the optical switch comprises a switchable mirror configured to switch between a reflection state reflecting the light received by said first and second light collector of the binocular collecting module to said first and second zone of the light sensor and a transparent state allowing the light received by the monocular collecting module to be focused directly on said monocular zone of the light sensor, and/or
- the switchable mirror comprises a liquid crystal with a cholesteric phase, and/or
- the switchable mirror comprises a gazochromic switch, and/or
- said first light collector of the binocular collecting module comprises a first optical lens configured to focus light from the environment into the optical waveguide and said second light collector of the binocular collecting module comprises a second optical lens configured to focus light from the environment into the optical waveguide, and/or
- the first optical lens has a first optical function and the second optical lens has a second optical function different from said first optical function, for example said first optical function comprises a first spectral light filter and said second optical function comprises a second spectral light filter different from said first spectral light filter, and/or
- the first and/or second distant light collectors of the binocular module is/are configured so that the first and second light collectors are disposed at an adjustable distance.

The invention further relates to a light acquisition device comprising:
a light sensor, and a light collecting device according to the invention and configured to guide the light collected by the collecting module guided to said light sensor.

The invention also relates to a method for calibrating the light acquisition device according to the invention, wherein the first and second zones of the light sensor are determined by alternatively masking said first and second light collector of the binocular collecting module.

The invention further relates to a method for personalizing the light collecting device according to the invention for a user, wherein the binocular collecting module is personalized so that the distance between the two distant light collectors is substantially equal to the interpupillary distance of the user.

The invention further relates to a computer program product comprising one or more stored sequences of instructions that are accessible to a processor and which, when executed by the processor, causes the processor to carry out the steps of the method according to the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Other characteristics and advantages of the invention will become more apparent from the claims and from the following description of some embodiments given by way of example without limitation with reference to the drawings, in which:

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1A:
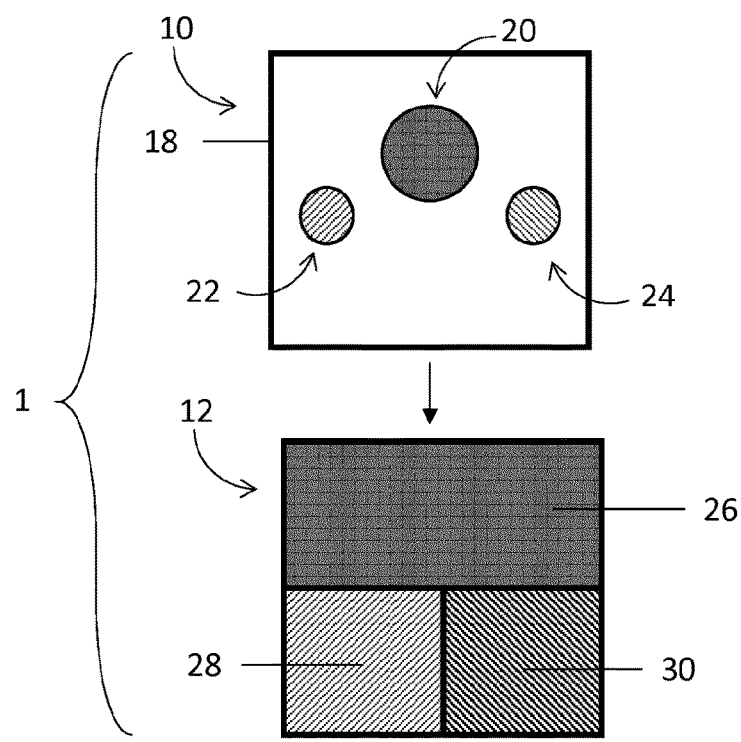
FIG. 1a represents schematically a light acquisition device according to an embodiment of the invention.

FIG. 1a represents a light acquisition device 1 according to the invention.

The light acquisition device 1 comprises a light collecting device 10 and a light sensor 12 whose surface is photosensitive and may be represented as an array of contiguous elementary photo-sensitive cells (not represented) called pixels. Each pixel produces an electric signal representative of the amount of light received by the pixel. An acquisition of the electric signals issued by said pixels allows to constitute a two-dimensional image.

The light collecting device 10 may be configured to be removably fixed to a device comprising a light sensor, such as a head mounted device, or a smartphone, or a touchpad.

Furthermore, the light collecting device 10 may comprise an electric power supply. The collecting device 10 may be powered by the system on which the device is mounted, for example a head mounted device, a smartphone or a touchpad.

The light collecting device 10 is adapted to collect light and guide collected light to the light sensor 12.

The light collecting device 10 may be one piece of plastic body or may be plastic molded in order to reduce the production costs.

The light collecting device 10 may comprise a monocular collecting module, a binocular collecting module and an optical waveguide 18.

As illustrated on FIG. 1a, the monocular collecting module may comprise at least one light collector 20 configured to collect light from the environment of the light collecting device 10, and the binocular collecting module may comprise a first and a second distant light collectors 22, 24 configured to collect light from the environment of the light collecting device 10.

The light sensor 12 may be a CMOS or CCD sensor. The light sensor 12 may be identical to the light sensors commonly used in mobile phones or digital cameras. The light sensor 12 may be rectangular shaped. For example, each side of the light sensor 12 may be smaller or equal to 10 mm.

Moreover, the light sensor 12 may be divided into different zones. As illustrated on FIG. 1a, the light sensor 12 is divided into three contiguous and complementary zones: a monocular zone 26, a first and a second zone 28, 30 corresponding to a binocular zone.

The monocular zone 26 of the light sensor 12 corresponds to the pixels of the light sensor 12 which receive light from the light collector 20 of the monocular collecting module when the light collectors 22, 24 of the binocular collecting module are masked.

The first zone 28 of the light sensor 12 corresponds to the pixels of the light sensor 12 which receive light from the first light collector 22 of the binocular collecting module when the second light collector 24 of the binocular collecting module is masked.

The second zone 30 of the light sensor 12 corresponds to the pixels of the light sensor 12 which receive light from the second light collector 24 of the binocular collecting module when the first light collector 22 of the binocular collecting module is masked.

The frontier between different zones may not be used because the optical adjustment may cause some pixels to not be targeted by the light coming from the optical waveguide 18. When transferred into a processor memory, the signal issued by said pixels should be discarded.

The light acquisition device 1 may be in:
- a monocular state where light collected by the monocular collecting module of the light collecting device 10 is sent to a monocular zone 26 of the light sensor 12;
- a binocular state where light collected by the first and the second collecting module of the binocular collecting modules 22, 24 is simultaneously sent to a first and a second zone 28, 30 of the light sensor 12. Said first zone and said second zones of the light sensor have no overlap;
- a mixed state where simultaneously the light collected by the monocular collecting module is sent to the monocular zone 26 of the light sensor light 12 and the light collected by a first and a second collecting modules of the binocular collecting module is simultaneously sent to a first and a second zone 28, 30 of the light sensor 12. The monocular zone 26 of the light sensor and the first and second zones 28, 30 of the light sensor have no overlap.

The non-overlap of the first and second zones of the light sensor 12 comes from the fact that the pixels of the first zone 28 of the light sensor 12, namely the pixels of the light sensor 12 which receive light from the first light collector 22 of the binocular collecting module when the second light collector 24 of the binocular collecting module is masked, are distinct from the pixels of the second zone 30 of the light sensor 12, namely the pixels of the light sensor 12 which receive light from the second light collector 24 of the binocular collecting module when the first light collector 22 of the binocular collecting module is masked.

Figure 2:
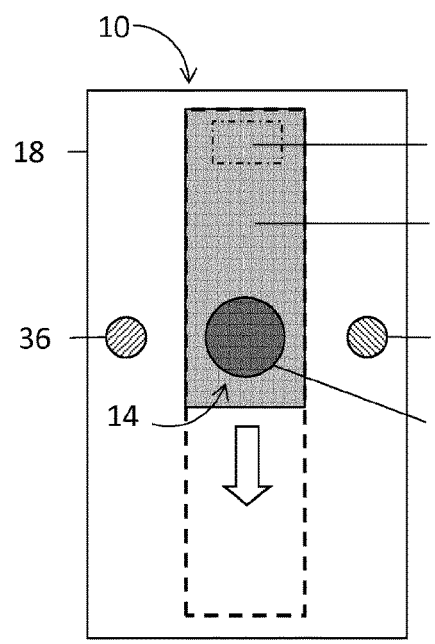
Figure 4:
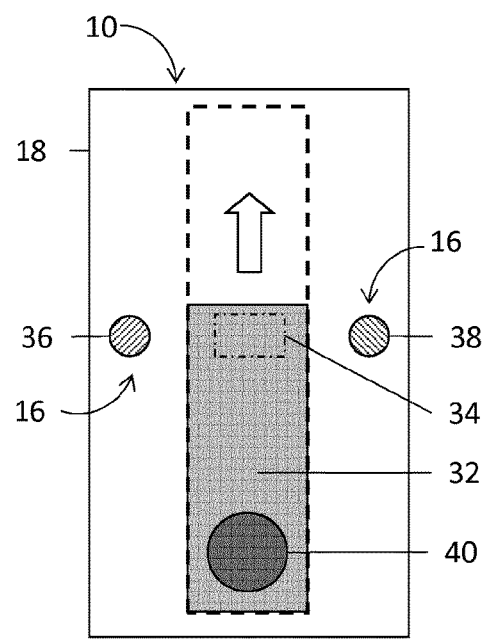

For example, a monocular collecting module 14 is represented on FIG. 2 and a binocular collecting module 16 is represented on FIG. 4.

FIGS. 2 and 4 represent the same light collecting device 10 respectively in the monocular state (FIG. 2) and in the binocular state (FIG. 4).

On FIG. 2, the monocular collecting module 14 is placed such that the light collected by the collecting modules 14 reaches directly the light sensor (not represented). Here "directly" means "without any reflection of the light".

On FIG. 4, the binocular collecting module 16 is placed such that the light collected by the collecting modules 16 reaches indirectly, via at least one reflection over a switchable mirror 34, the light sensor (not represented).

In said monocular state, no light is sent on any first or second zone 28, 30 of the light sensor 12. In other words, the light collected by the first and second light collector 22, 24 of the binocular collecting module 16 is not sent to the first and second zone 28, 30 of the light sensor 12.

Figures 1B, 1C:
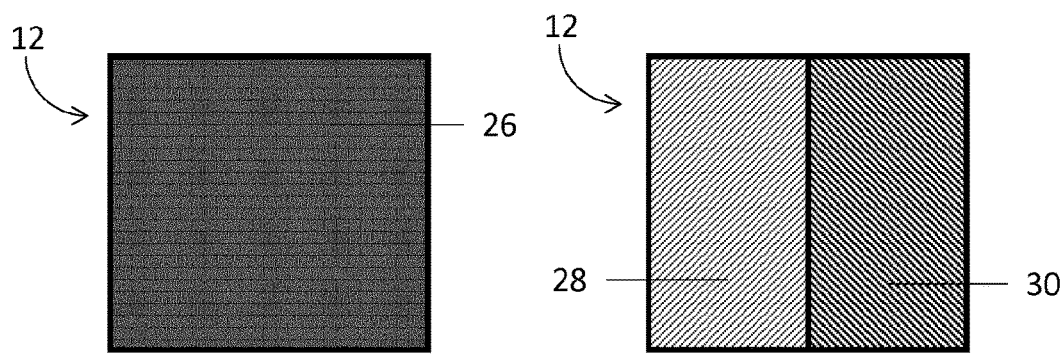
FIGS. 1b and 1c represent a light sensor according to embodiments of the invention, FIGS. 2 and 3 respectively illustrate a top view and a cross-section view of a light acquisition device according to the invention in a monocular state, FIGS. 4 and 5 respectively represent a top view and a cross-section view of a light acquisition device according to the invention in a binocular state.

The monocular zone 26 may be a part of the light sensor 12, as illustrated on FIG. 1a, or may be the full light sensor 12 as illustrated on FIG. 1b. The configuration of FIG. 1b allows obtaining a two-dimensional image with greater quality, without increasing the production costs.

In said monocular state, the light acquisition device 1 enables an acquisition of the signal from pixels of the monocular zone to constitute a two-dimensional image of an environment.

In said binocular state, no light is sent on the monocular zone 26 of the light sensor 12. In other words, the light collected by the monocular collector 20 is not sent to the monocular zone 26 of the light sensor 12.

The binocular zone, comprising the first and second zones 28, 30 may be a part of the light sensor 12, as illustrated on FIG. 1a, or may be the full light sensor 12 as illustrated on FIG. 1c.

The configuration of FIG. 1c allows obtaining a pair of two-dimensional images that may be used for showing a three-dimensional image of an environment with greater quality, without increasing the production costs.

In said binocular state, the light acquisition device 1 enables a simultaneous acquisition of the signal from pixels of the first and second zones to constitute a pair of two-dimensional binocular images that may be used for showing a three-dimensional image of an environment.

In said mixed state, the light acquisition device 1 enables a simultaneous acquisition of:
- the signal from pixels of the monocular zone to constitute a two-dimensional image of an environment;
- the signal from pixels of the first and second zones to constitute a pair of two-dimensional image that may be used for showing a three-dimensional image of an environment;

Further, in said mixed state, the light acquisition device 1 enables a simultaneous enlightening from pixels of the monocular zone and from pixels of the first and second zones, and then a simultaneous acquisition of the signals issued by pixels of the monocular zone and of the signal from pixels of the first and second zones.

As shown on FIGS. 1a and 1c, the optical waveguide 18 may be configured so that the first zone 28 and the second zone 30 of the light sensor 12 have no overlap. In other words, the first zone 28 and the second zone 30 of the light sensor 12 may be adjacent and may not superpose one on the other at any part.

As shown on FIG. 1a, the optical waveguide 18 is further configured so that the monocular zone 26 of the light sensor 12 and the first and second zones 28, 30 of the light sensor 12 have no overlap. More precisely, the monocular zone 26, the first and second zones 28, 30 of the light sensor 12 may not superpose one on the other at any part.

The non-overlap of the monocular zone 26 of the light sensor 12 and the first and second zones 28, 30 of the light sensor 12 comes from the fact that the pixels of the monocular zone 26 of the light sensor 12, namely the pixels of the light sensor 12 which receive light from the light collector 20 of the monocular collecting module when the light collectors 22, 24 of the binocular collecting module are masked, are distinct from the pixels of the first and second zones 28, 30 of the light sensor 12, namely the pixels of the light sensor 12 which receive light from the first and second light collectors 22, 24 of the binocular collecting module when the light collector 20 of the monocular collecting module is masked.

Advantageously, as illustrated on FIGS. 1a and 1b, it is observed that the size of the monocular zone 26 may be greater in monocular state than in the mixed state.

Advantageously, as illustrated on FIGS. 1a and 1c, it is observed that the size of the binocular zone 28, 30 may be greater in binocular state than in the mixed state.

Moreover, the light acquisition device 1 may comprise a single light sensor 12, as illustrated on FIG. 1a, in order to avoid the process of synchronization. Indeed, with such light acquisition device 1, there is no need to synchronize different light sensors and thus, the production costs are reduced.

The optical waveguide 18 is configured to guide the light collected by the monocular and binocular collecting modules to the light sensor 12.

Figure 3:
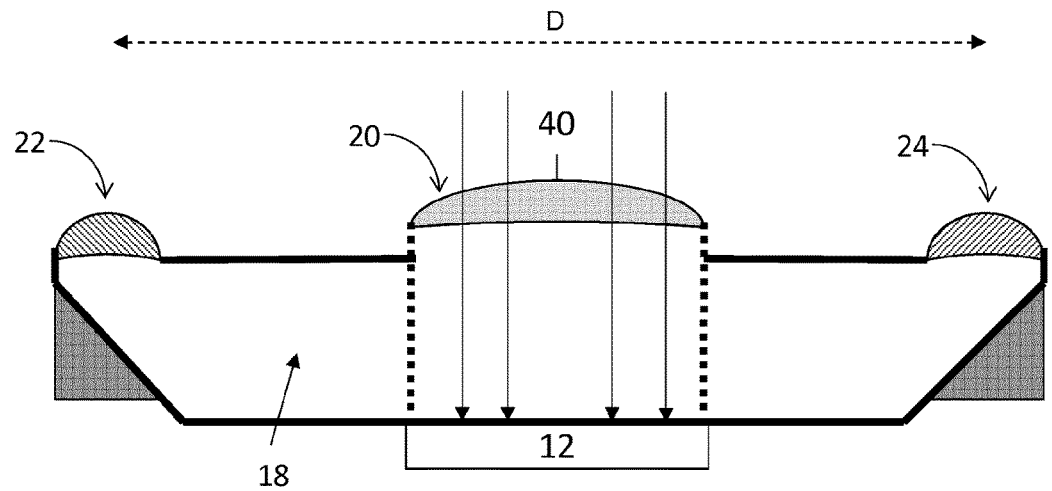
Figure 5:
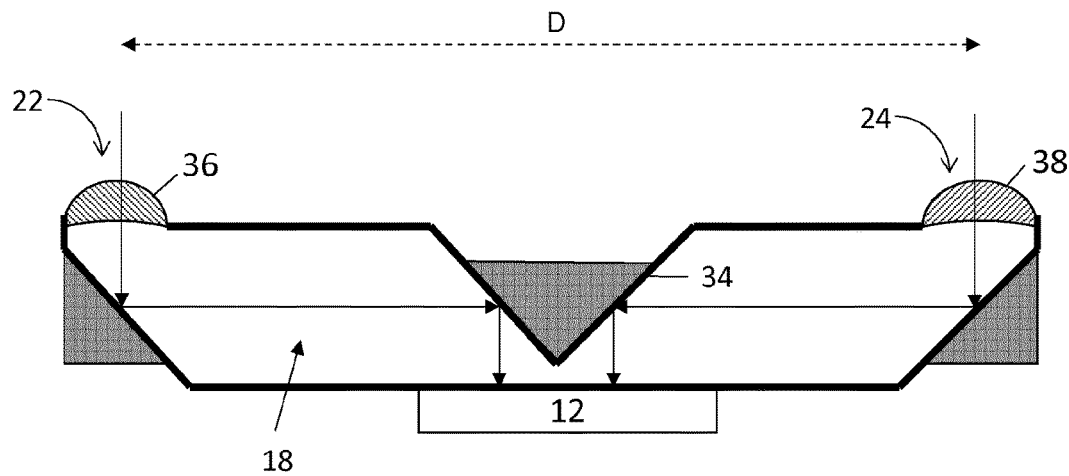

As regards to FIGS. 3 and 5, the monocular and binocular collecting modules may be separated by the light sensor 12 with the optical waveguide 18.

The optical waveguide 18 may have a substantially parallelepiped form, with the monocular collector 20 located in the middle of a face of the optical waveguide 18, the first distant light collector 22 located on a first side of the monocular collector 20, the second distant light collector 24 located on a second side of the monocular collector 20.

The monocular collector 20 may comprise a monocular lens 40.

The first light collector 22 of the binocular collecting module 16 may comprise a first optical lens 36 configured to focus light from the environment into the optical waveguide 18. The second light collector 24 of the binocular collecting module 16 may comprise a second optical lens 38 configured to focus light from the environment into the optical waveguide 18.

For example, a monocular lens 40, a first and second optical lenses 36, 38 are illustrated on FIGS. 2 and 4.

The first optical lens 36 may have a first optical function. The second optical lens 38 may have a second optical function different from the first optical function. For example, the first optical function may comprise a first spectral light filter, and the second optical function may comprise a second spectral light filter, different from the first spectral light filter.

The monocular lens 40 and the first and second optical lenses 36, 38 may be aligned or not aligned, according to the configuration of the waveguide. For example, with reference to FIG. 2, the monocular lens 40 is aligned with the first and second optical lenses 36, 38.

The light collected by the monocular collecting module is guided to the monocular zone 26 of the light sensor 12. The light collected by the first and second light collectors 22, 24 of the binocular collecting module is respectively guided towards the first and second zones 28 of the light sensor 12.

Advantageously, the first and second zones 28, 30 have the same shape and size in order to reduce the computing time required for providing a three dimensional image.

The monocular and the first and second zones may have different sizes and shapes.

In a preferred embodiment, the monocular and the first and second zones have the same shape and size in order to provide respectively two-dimensional and three-dimensional images having the same size (i.e. an identical number of pixels in height and width).

The light sensor 12 may be divided in any different ways. For example, as illustrated on FIG. 1a, the monocular zone 26 may be located on the upper side of the light sensor 12 and the binocular zone may be located on the lower side of the light sensor 12. The binocular zone is preferably located on a complementary side to the monocular zone. For example, when the monocular zone is located on the upper side of the light sensor 12, the first zone 28 may be located on the lower left side of the light sensor 12 and the second zone 30 may be located on the lower right side of the light sensor 12.

The full light sensor surface may be not completely used, depending of the optical waveguide geometry in the different configurations. Typical light sensors have a square shape or a rectangular shape with 4/3 or 16/9 width/height ratio, that does not always fit with the optical waveguide used in this invention.

The optical waveguide 18 may further comprise covers (not shown) to prevent the first and second optical lenses 36, 38 to receive light or to prevent the monocular lens 40 to receive light.

In order to calibrate the monocular and binocular states, the invention further relates to a method for calibrating the light acquisition device 1 according to the invention.

More precisely, the first and second zones 28, 30 of the light sensor 12 are determined by alternatively masking the first and second light collectors 22, 24 of the binocular collecting module.

For example, for calibrating the first zone 28 of the light sensor 12, the second light collector 24 of the binocular collecting module is masked and the first light collector 22 of the binocular collecting module is unmasked.

The method for calibrating the light acquisition device 1 allow measuring the positioning of the light collecting device 10 relative to the light sensor in order to reduce the positioning error. The positioning error may be several pixels.

The calibration of the light acquisition device 1 allows obtaining a good three-dimensional image resulting from the correlation by triangulation of the right and left two-dimensional images acquired on the binocular state.

Figure 8A:
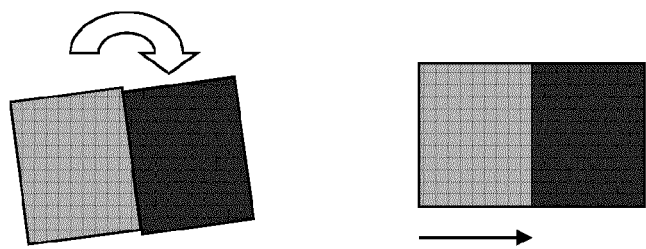
FIGS. 8a, 8b and 8c represent embodiments of a method for calibrating a light acquisition device according to the invention.
Figure 8B:
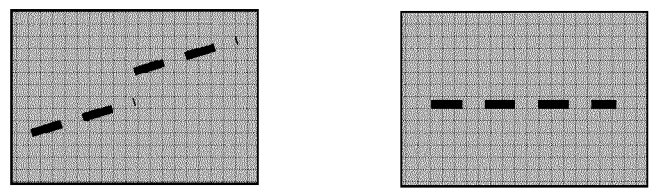

The calibration consists on the orientation of the device in order to obtain images well-distributed on the left and right of the light sensor 12. For example, as illustrated on FIG. 8a, the horizontal gradient may be maximized when the first light collector of the binocular collecting module is masked and the second light collector of the binocular collecting module is unmasked, after a simple vertical projection of the full image. As another example, as illustrated on FIG. 8b, the vertical gradient may be maximized by rotation of a line if the sensors are placed in front of a horizontal line, after a horizontal projection of the image. Vertical and horizontal projections are simple image processing well known in the domain of image processing.

Figure 8C:
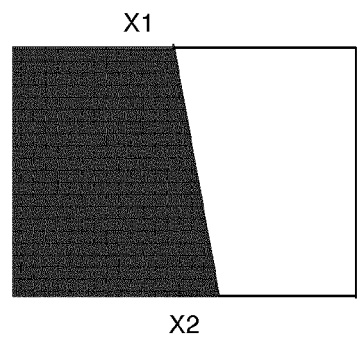

If the modification of the orientation of the light collecting device relative to the light sensor is not possible, the calibration may be obtained with a software. In this case, the calibration may be obtained by memorizing the position the line separating the image resulting from the first and second zones of the light sensor, when one of the two light collectors of the binocular collecting module is masked, as illustrated on FIG. 8c. The points X1 and X2 are positioned on the upper and lower sides of the image and correspond to the line separating the image resulting from the first and second zones of the light sensor. The position of X1 and X2 may be measured in order to obtain the geometry of the light collecting device and to deduce the rotations and translations to do for precisely separating the two images. During this operation, the pixels on the edge of the zone can be detected to be discarded during further image processing and transmission.

This calibration method does not need an accurate position at the level of the device manufacturing. Moreover, each device may be calibrated individually, with its own values and the corrective calculation may be done for each image acquisition, since the rotation of the image is more complex than a simple translation. Accurate calibration method can be used to store into the final equipment memory a calibration file, and allow further image processing for three-dimensional calculation. Calibration methods for three-dimensional imaging are well known, many methods have been published.

The optical waveguide 18 may comprise straight portions and/or tilted portions and/or curved portions for guiding and/or reflecting the light issued from the monocular and/or binocular collecting modules to the monocular and/or first and second zones of the light sensor 12.

For instance, the optical waveguide may be an optical fiber.

Moreover, the optical waveguide 18 may comprise an optical switch.

The optical switch is configured for enabling a switch between the monocular state and the binocular state (and vice versa).

The optical switch may further allow switching between the monocular state, the binocular state or the mixed state (and vice versa). This embodiment is not represented.

The optical switch may be removable from the light collecting device 10. For example, the mixed state may be obtained when the optical switch is removed from the light collecting device 10.

The optical switch may comprise mechanic means controllable between the different states. In other words, the optical switch may be actioned, namely may move from a first position to a second position, with a mechanic system. The optical switch may comprise an opto-mechanic switch 32 which is mechanically controllable between the different states. For example, the opto-mechanic switch may be manually slided or slidably driven by a motor between the different states.

As illustrated on FIG. 2, the opto-mechanic switch 32 allows placing the monocular lens 40 above the light sensor; more precisely it is disposed between the environment and the light sensor. In the monocular state, the opto-mechanic switch 32 is configured to send directly the light received by the monocular collecting module to the monocular zone of the light sensor 12. The optical waveguide 18 may comprise an opaque straight portion for preventing the light received by the binocular collecting module to be sent towards the light sensor 12. For example, the path of the light is illustrated by arrows on FIG. 3.

As illustrated on FIG. 4, the opto-mechanic switch 32 allows placing mirrors 34 just above the light sensor. In the binocular state, the optical switch 32 is configured to reflect the light received by the first light collector 22 of the binocular collecting module 16 to the first zone of the light sensor 12 and the light received by the second light collector 24 of the binocular collecting module 16 to the second zone of the light sensor 12. For example, the light may be reflected twice, as illustrated on FIG. 5 with arrows prior reaching the light sensor.

The reflection of the light received by the first and second light collectors 22, 24 may be realized with mirrors 34 or prisms (not shown) comprised in the opto-mechanic switch 32. Moreover, the optical waveguide 18 may comprise tilted portions with the mirrors or prisms.

The prism or mirror angle can be adapted to give a chosen field of view on the light sensor targeted area. For example it may be 4/3 or 16/9 format. In such cases, the light sensor pixels do not represent a square but a rectangle, and a software and a display device should take this pixel size into account to display a correctly sized image and to make any computation on the different images acquired by the different lenses and the optical waveguide.

The optical switch may also comprise an opto-electronic switch 32 which comprises switchable mirrors 34. The switchable mirrors are configured to switch between a reflection state and a transparent state.

Figure 6:
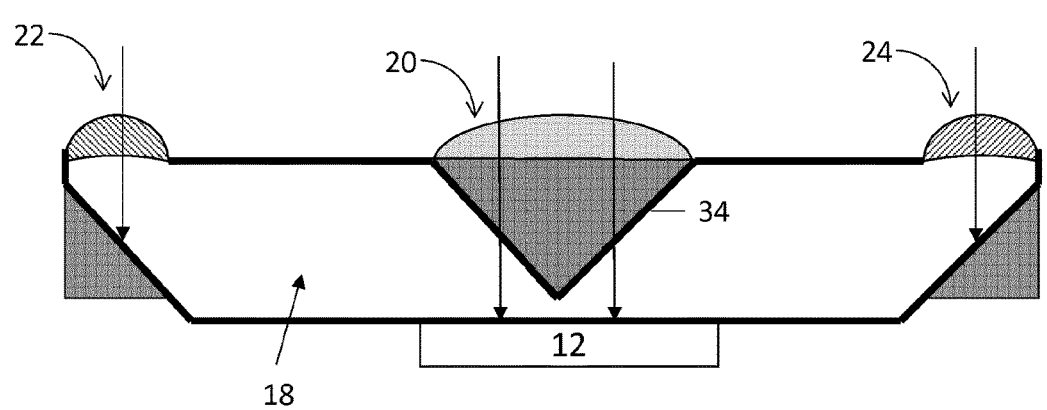
FIGS. 6 and 7 illustrate a cross-section view of a light acquisition device according to the invention respectively in a monocular state and in a binocular state.

In the monocular state, the switchable mirror 34 is in a transparent state allowing the light received by the monocular collecting module 20 to be focused directly on the monocular zone of the light sensor 12 and preventing the light received by the first and second light collectors 22, 24 to be sent to the light sensor 12. A transparent state of the switchable mirror 34 is illustrated on FIG. 6.

Figure 7:
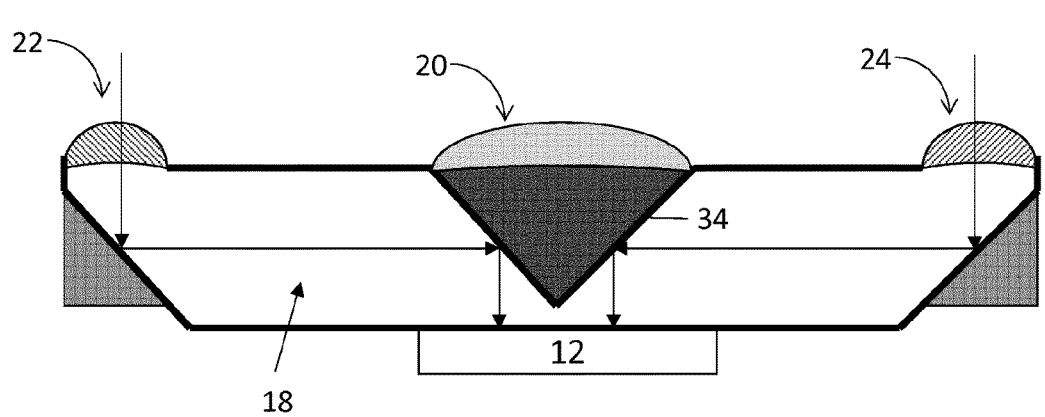

In the binocular state, the switchable mirror 34 is in a reflection state reflecting the light received by the first and second light collector 22, 24 of the binocular collecting module 16 to the first and second zone of the light sensor 12 and preventing the light received by the monocular collecting module 20 to be sent to the light sensor 12. A reflection state of the switchable mirror 34 is illustrated on FIG. 7.

In the mixed state, the switchable mirror may comprise a first part in a transparent state and a second part in a reflection state. The first part of the switchable mirror allows the light received by the monocular collecting module to be focused directly on the monocular zone of the light sensor and the light received by the first and second light collectors not to be sent to the light sensor. The second part of the switchable mirror allows reflecting the light received by the first and second light collector of the binocular collecting module to the first and second zone of the light sensor and preventing the light received by the monocular collecting module to be sent to the light sensor.

The switchable mirror 34 may comprise a gazochromic switch.

A gazochromic switch is realized by introducing hydrogen in an alloy. The hydrogenation of the alloy renders it transparent. The return to a reflection state is realized by introducing oxygen at the surface of the alloy. With the dehydrogenation of the surface, the alloy becomes a mirror again. The alloy may be a magnesium alloy.

The switchable mirror 34 may comprise a liquid crystal with a cholesteric phase.

An electrical field applied to the cholesteric phase allows the reflection of the light. The liquid crystal may be activated and/or deactivated in order to switch from a monocular to a binocular state. For example, the switchable mirror 34 comprises a liquid crystal which is deactivated on FIG. 6 and activated on FIG. 7.

In the mixed state, the light collecting device 10 may collect and guide simultaneously the light corresponding to both the monocular and binocular collecting modules 14, 16 towards the light sensor 12. More precisely, the light reaches simultaneously the monocular zone 26 and the first and second zones 28, 30. In other words, the three zones 26, 28, 30 of the light sensor 12 are enlightened simultaneously. Then, a user of the light acquisition device 1 may acquire simultaneously a two-dimensional monocular image and a pair of two-dimensional binocular images that may be used for presenting a three-dimensional image of the environment. He may also acquire selectively the two-dimensional monocular image or the pair of two-dimensional binocular images thanks to a so called software switch of the light acquisition device 1.

The light acquisition device 1 may further comprise the software switch which is a piece of software configuring the light sensor in a so called "partial scan" mode. When operating in this "partial scan" mode, the light sensor may be configured for acquiring (or reading) only the signals issued by pixels belonging to this a selected zone.

More precisely, this selected zone may be the monocular zone 26 or the first and second zone 28, 30 or even both the monocular zone 26 and the first and second zones 28, 30 of the binocular zones. In other words, the software switch enables to select among the information received by the light sensor 12 a posteriori. Indeed, the light sensor 12 receives light from both the monocular and binocular light collectors, and the software switch acquires the signal issued from the pixels of the monocular zone 26 or the signals issued from the pixels of the binocular zones or even the signal issued from the pixels of both the monocular zone 26 and the first and second zones 28, 30 of the binocular zones thanks to the "partial scan" mode of the light sensor.

Many light sensors, such as for example the CMOS sensors, offer this "partial scan" mode of operation.

Moreover, in the mixed state, the software switch has a function similar to the switching function of the optical switch 32.

Moreover, the first distant light collector 22 of the binocular module may be configured so that the first and second light collectors 22, 24 are disposed at an adjustable distance D one from the other. In other words, the first distant light collector 22 of the binocular module may be movable between at least a first and a second position so as to adjust the distance D between the first and second light collectors 22, 24. For instance, the length of the waveguide 18 on the first distant light collector side may be adjustable.

The distance between the first and the second light collectors 22, 24 allows recalculating by triangulating the distances of the two-dimensional images in order to reconstitute the image in three dimensions.

The second distant light collector 24 of the binocular module may be configured so that the first and second light collectors 22, 24 are disposed at an adjustable distance D one from the other. In other words, the distance D between the first and second light collectors 22, 24 of the binocular module may be adjusted by having the second distant light collector 24 movable between at least a first and a second position. For example, the length of the waveguide 18 on the second distant light collector side may be adjustable.

In a preferred embodiment, the first and second distant light collectors 22, 24 of the binocular module 16 are configured so that the first and second light collectors 22, 24 are disposed at an adjustable distance D one from the other. In other words, both the first and second distant light collectors 22, 24 of the binocular module may be movable between at least a first and a second position so as to adjust the distance D between them. For instance, the length of the waveguide 18 on both the first distant light collector side and the second distant light collector side may be adjustable.

For example, as regards to FIGS. 3 and 5, the adjustable distance D is referred as the distance between the center of the optical lenses 36, 38 of the first and second light collectors 22, 24 respectively.

The adjustable distance D may be greater than or equal to 10 mm and smaller than or equal to 20 mm.

The invention further relates to a method for personalizing the light collecting device 1 according to the invention for a user.

The binocular collecting module may be personalized so that the distance D between the two distant light collectors 22, 24 is substantially equal to the interpupillary distance of the user. For example, the adjustable distance D may be greater than or equal to 52 mm and smaller than or equal to 78 mm, these values representing the mean values of the interpupillary distance of a user. D can also be fixed at 65 mm value to represent a standard interpupillary distance but with no possible adjustment and reduced cost.

The invention has been described above with the aid of embodiments without limitation of the general inventive concept. Moreover, the embodiments of the invention may be combined without any restriction.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A light collecting device adapted to collect and guide light to a light sensor, the device comprising:
   a monocular collecting module comprising at least one light collector configured to collect light from the environment of the device,
   a binocular collecting module comprising a first and a second distant light collector configured to collect light from the environment of the device,
   an optical waveguide configured to guide the light collected from the monocular and binocular collecting modules to a light sensor so that:
     the light collected by the monocular collecting module is guided to a monocular zone of the light sensor,
     the light collected by the first light collector of the binocular collecting module is sent to a first zone of the light sensor, and
     the light collected by the second light collector of the binocular collecting module is sent to a second zone of the light sensor,
   wherein the optical waveguide is configured so that said first zone and said second zone of the light sensor have no overlap.

2. The light collecting device according to claim 1, wherein the optical waveguide is configured so that the monocular zone of the light sensor and the first and second zones of the light sensor have no overlap.

3. The light collecting device according to claim 1, wherein
   in said monocular state, the light collected by the first and second light collector of the binocular collecting module is not sent to the first and second zone of the light sensor; and
   in said binocular state, the light collected by the monocular light collector is not sent to the monocular zone of the light sensor.

4. The light collecting device according to claim 3, wherein the optical waveguide comprises an optical switch configured between a monocular state wherein the light collected by the monocular collecting module is guided to the monocular zone of the light sensor and a binocular state wherein the light collected by the first light collector of the binocular collecting module is sent to the first zone of the light sensor, and the light collected by the second light collector of the binocular collecting module is sent to the second zone of the light sensor.

5. The light collecting device according to claim 4, wherein in the monocular state the optical switch is configured to send directly the light received by the monocular collecting module to the light sensor and in the binocular state the optical switch is configured to reflect the light received by the first light collector of the binocular collecting module to the first zone of the light sensor and the light received by the second light collector of the binocular collecting module to the second zone of the light sensor.

6. The light collecting device according to claim 4, wherein the optical switch is mechanically controllable between the different states.

7. The light collecting device according to claim 4, wherein the optical switch comprises a switchable mirror configured to switch between a reflection state reflecting the light received by said first and second light collector of the binocular collecting module to said first and second zone of the light sensor and a transparent state allowing the light received by the monocular collecting module to be focused directly on said monocular zone of the light sensor.

8. The light collecting device according to claim 7, wherein the switchable mirror comprises a liquid crystal with a cholesteric phase.

9. The light collecting device according to claim 7, wherein the switchable mirror comprises a gazochromic switch.

10. The light collecting device according to claim 1, wherein said first light collector of the binocular collecting module comprises a first optical lens configured to focus light from the environment into the optical waveguide and said second light collector of the binocular collecting module comprises a second optical lens configured to focus light from the environment into the optical waveguide.

11. The light collecting device according to claim 10, wherein the first optical lens has a first optical function and the second optical lens has a second optical function different from said first optical function, said first optical function comprises a first spectral light filter and said second optical function comprises a second spectral light filter different from said first spectral light filter.

12. The light collecting device according to claim 11, wherein the first and/or second distant light collectors of the binocular module is/are configured so that the first and second light collectors are disposed at an adjustable distance.

13. A light acquisition device comprising:
   a light sensor, and
   a light collecting device according to claim 1 configured to guide the light collected by the collecting module guided to said light sensor.

14. A method for calibrating the light acquisition device according to claim 13, wherein the first and second zones of the light sensor are determined by alternatively masking said first and second light collector of the binocular collecting module.

15. A method for personalizing the light collecting device according to claim 1 for a user, wherein the binocular collecting module is personalized so that a distance between the two distant light collectors is substantially equal to an interpupillary distance of the user.

* * * * *